(12) United States Patent
Yoshida et al.

(10) Patent No.: US 7,930,855 B2
(45) Date of Patent: Apr. 26, 2011

(54) AUTOMATIC OPENING/CLOSING APPARATUS FOR VEHICLE

(75) Inventors: Yasushi Yoshida, Kiryu (JP); Yoshitaka Sekine, Kiryu (JP); Yoshitaka Urano, Kiryu (JP); Taizo Kikuchi, Wako (JP); Hidetoshi Ijuin, Wako (JP); Ryuichi Nakano, Wako (JP)

(73) Assignees: MITSUBA Corporation, Kiryu-shi (JP); Honda Motor Co., Ltd., Tokyo (JP)

( * ) Notice: Subject to any disclaimer, the term of this patent is extended or adjusted under 35 U.S.C. 154(b) by 531 days.

(21) Appl. No.: 12/022,321

(22) Filed: Jan. 30, 2008

(65) Prior Publication Data

US 2008/0178529 A1 Jul. 31, 2008

(30) Foreign Application Priority Data

Jan. 31, 2007 (JP) ................................ 2007-021933

(51) Int. Cl.
*E05F 11/00* (2006.01)
(52) U.S. Cl. .......................................... 49/360; 296/155
(58) Field of Classification Search .................... 49/360; 296/155
See application file for complete search history.

(56) References Cited

U.S. PATENT DOCUMENTS

| 5,138,795 | A | * | 8/1992 | Compeau et al. | 49/138 |
| 5,168,666 | A | * | 12/1992 | Koura et al. | 49/360 |
| 5,319,881 | A | * | 6/1994 | Kuhlman | 49/360 |
| 6,009,671 | A | * | 1/2000 | Sasaki et al. | 49/352 |
| 6,038,818 | A | * | 3/2000 | Haag et al. | 49/360 |
| 7,422,094 | B2 | * | 9/2008 | Yokomori | 192/84.7 |
| 7,434,354 | B2 | * | 10/2008 | Yokomori | 49/360 |
| 7,530,199 | B2 | | 5/2009 | Yokomori et al. | |
| 7,568,310 | B2 | * | 8/2009 | Sato et al. | 49/360 |
| 7,584,572 | B2 | * | 9/2009 | Yokomori et al. | 49/360 |
| 7,703,838 | B2 | * | 4/2010 | Yokomori | 296/155 |
| 7,707,775 | B2 | * | 5/2010 | Yokomori et al. | 49/360 |
| 2007/0209283 | A1 | * | 9/2007 | Ostrowski et al. | 49/360 |
| 2008/0000161 | A1 | * | 1/2008 | Nagai et al. | 49/360 |

FOREIGN PATENT DOCUMENTS

JP 2003-269040 9/2003

OTHER PUBLICATIONS

European Search Report for Serial No. EP 08 10 1112 dated Jul. 23, 2009.

* cited by examiner

*Primary Examiner* — Jerry Redman
(74) *Attorney, Agent, or Firm* — McCorminck, Paulding & Huber LLP

(57) ABSTRACT

A cost-reduced, downsized automatic opening/closing apparatus for vehicle is achieved by reducing the number of components thereof. A case of a driving unit is provided with a drum housing portion, and a driving drum is rotatably accommodated in the drum housing portion. An electric motor is attached to the case, and the driving drum is driven for rotation by the electric motor. A cable connected to a sliding door is wound around the driving drum. By rotation of the driving drum, the sliding door is opened and closed as being drawn by the cable. The case is provided with a substrate housing portion integrally with the drum housing portion, and a control substrate for controlling an operation of the electric motor is accommodated in the substrate housing portion.

7 Claims, 7 Drawing Sheets

VEHICLE FRONT ←→ VEHICLE BACK

AUTOMATIC OPENING/CLOSING APPARATUS FOR VEHICLE

CROSS REFERENCE TO RELATED APPLICATIONS

This application is entitled to the benefit of and incorporates by reference essential subject matter disclosed in Japanese Patent Application No. 2007-21933 filed on Jan. 31, 2007 and Japanese Patent Application No. 2007-21934 filed Jan. 31, 2007.

TECHNICAL FIELD OF THE INVENTION

The present invention relates to an automatic opening/closing apparatus for vehicle, which automatically opens and closes an open/close member provided on a vehicle body.

BACKGROUND OF THE INVENTION

Conventionally, a vehicle such as a wagon and a minivan is provided with, at a side part of its body, a sliding door that is opened and closed in vehicle-front and vehicle-back directions, thereby allowing passengers or merchandise to be easily loaded or unloaded from a side direction of the vehicle. This sliding door can normally be opened and closed by a manual operation. However, in recent years, there is also often found such a vehicle that the automatic opening/closing apparatus is mounted on the vehicle to automatically open and close the sliding door.

This automatic opening/closing apparatus is known as a cable type in which a cable (cable member) connected to the sliding door from the vehicle-front and vehicle-back directions is guided to a driving unit disposed in the vehicle body via reverse pulleys disposed at both ends of a guide rail; the cable is wound around a driving drum (driving rotor) provided to the driving unit; and this drum is driven for rotation by a driving source such as an electric motor so that the sliding door is automatically opened and closed while being drawn by the cable. In this case, a reduction-mechanism equipped motor in which a motor main body and a reduction mechanism are formed as one unit is used as the electric motor, wherein a case is fixed to this electric motor and a tensioner mechanism for applying a predetermined tension to the drum and the cable is accommodated in the case.

Meanwhile, in order to control an operation of the electric motor, the automatic opening/closing apparatus is provided with a control device. For example, Patent Document 1 (Japanese Patent Application Laid-Open Publication No. 2003-269040) discloses an automatic opening/closing apparatus in which the control device formed by accommodating a control substrate into a substrate case is disposed adjacently to a case of the driving unit to connect this control device and the driving unit via an external harness.

SUMMARY OF THE INVENTION

In the automatic opening/closing apparatus disclosed in Patent Document 1, however, since a case for the control device, the external harness, and the like are required separately from the case of the driving unit, the number of such components is increased, which results in an increase of costs of the automatic opening/closing apparatus. Moreover, since the control device is disposed adjacently to the driving unit, a projection area of the entire apparatus is increased, thereby causing the automatic opening/closing apparatus to get larger.

An object of the present invention is to reduce costs for an automatic opening/closing apparatus for vehicle by reducing the number of its components.

Another object of the present invention is to downsize the automatic opening/closing apparatus for vehicle.

An automatic opening/closing apparatus for vehicle according to the present invention is an apparatus for automatically opening and closing an open/close member provided to a vehicle body, and comprises: a cable member connected to the open/close member; a driving rotor disposed in the vehicle body, the cable member being wound around the driving rotor; a driving source for driving the driving rotor for rotation; a control substrate for controlling an operation of the driving source; and a case formed integrally with a rotor housing portion for accommodating the driving rotor and a substrate housing portion for accommodating the control substrate, attached to the driving source, and fixed to the vehicle body.

The automatic opening/closing apparatus for vehicle according to the present invention further comprises: a rotor member rotatably accommodated in the case and driven for rotation by the driving source; a driving shaft rotatably supported by the case and rotating along with the rotor member; and a detected subject disposed between the rotor member and the driving rotor and rotating along with the driving shaft, wherein the control substrate comprises a substrate main body whose part is disposed between the rotor member and the driving rotor, and a control circuit implemented on the substrate main body, and a rotation sensor for detecting rotation of the driving shaft is mounted on a portion of the substrate main body disposed between the rotor member and the driving rotor so as to oppose to the detected subject.

The automatic opening/closing apparatus for vehicle according to the present invention further comprises a motive-power intermissive mechanism for intermitting motive-power transmission between the rotor member and the driving shaft, the motive-power intermissive mechanism being provided in the case.

The automatic opening/closing apparatus for vehicle according to the present invention further comprises a tensioner mechanism for applying a predetermined tension to the cable member, wherein a tensioner housing portion for accommodating the tensioner mechanism is provided to the case integrally with the rotor housing portion and the substrate housing portion.

The automatic opening/closing apparatus for vehicle according to the present invention further comprises a reduction mechanism for reduction at rotation of the driving source to transmit it to the driving rotor, wherein a reduction-mechanism housing portion for accommodating the reduction mechanism is provided to the case integrally with the rotor housing portion and the substrate housing portion.

According to the present invention, the driving rotor around which the cable member is wound and the control substrate that controls the operation of the driving source are accommodated in the same case. Therefore, providing a case for accommodating the control substrate is not required separately from the case for accommodating the rotor member. Also, an external harness etc. for connecting the control substrate and the driving source is not required, so that the cost of the automatic opening/closing apparatus for vehicle can be reduced. Since a case for accommodating the control substrate is not required, for example, layout quality of each member can be increased, thereby making it possible to downsize the automatic opening/closing apparatus for vehicle.

Also, according to the present invention, a part of the control substrate is disposed between the driving rotor and the rotor member, and the rotation sensor is mounted on the above-mentioned part. Therefore, providing a substrate for the rotation sensor is not required separately from the control substrate, so that the number of components is reduced and the cost of the automatic opening/closing apparatus for vehicle can be reduced.

Furthermore, according to the present invention, since the motive-power intermissive mechanism for intermitting the motive-power transmission between the rotor member and the driving shaft is accommodated in the case, an additional case for accommodating the motive-power intermissive mechanism is not required. Therefore, the cost of the automatic opening/closing apparatus for vehicle is further reduced, and its downsizing can be also achieved.

Still further, according to the present invention, the tensioner mechanism for applying the predetermined tension to the cable member is also accommodated in the case for accommodating the driving rotor and the control substrate. Therefore, even when the tensioner mechanism is provided, the cost of the automatic opening/closing apparatus for vehicle is reduced, and its downsizing can be also achieved.

Still further, according to the present invention, the reduction mechanism for decelerating the rotation of the driving source and transmitting it to the driving rotor is also accommodated in the case for accommodating the driving rotor and the control substrate. Therefore, a case for accommodating the deceleration mechanism is not required, so that the cost of the automatic opening/closing apparatus for vehicle is further reduced and its downsizing can be also achieved.

DESCRIPTION OF THE PREFERRED EMBODIMENTS

An embodiment according to the present invention will be described in detail below with reference to the drawings.

Figure 1:
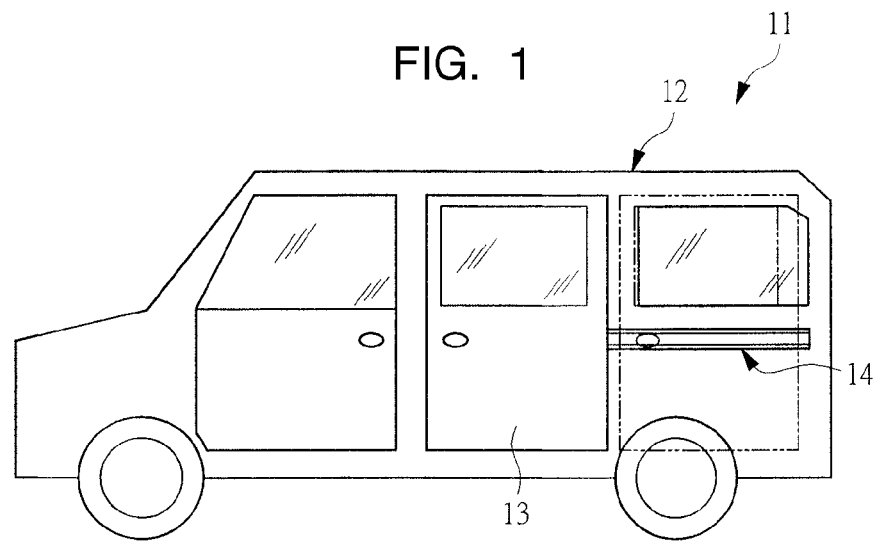
FIG. 1 is a side view showing a minivan-type vehicle.
Figure 2:
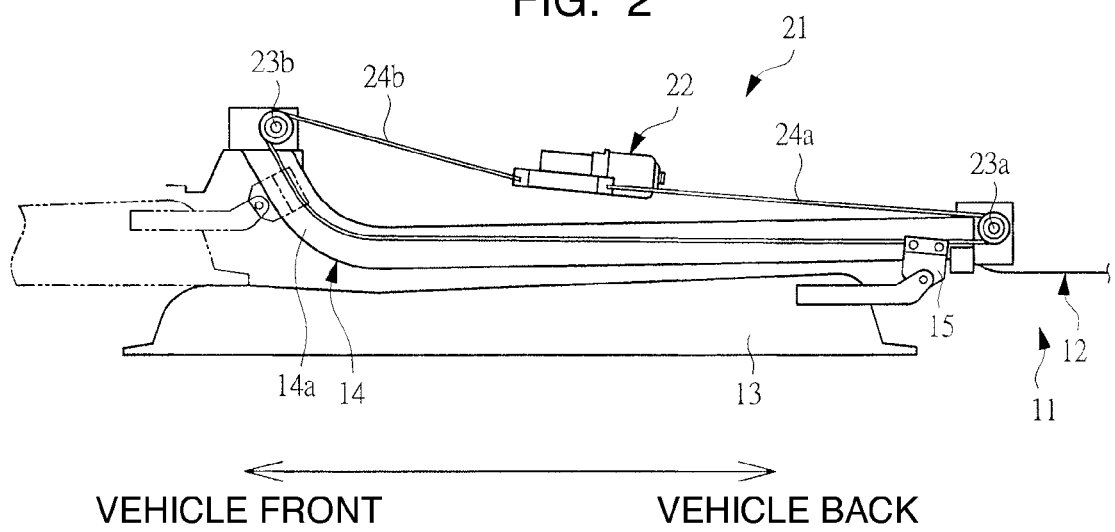
FIG. 2 is a top view showing a structure in which a sliding door depicted in FIG. 1 is attached to a vehicle body.

FIG. 1 is a side view showing a minivan-type vehicle, and FIG. 2 is a top view showing a structure in which a sliding door depicted in FIG. 1 is attached to a vehicle body.

A side part of a vehicle body 12 of a minivan-type vehicle 11 depicted in FIG. 1 is provided with a sliding door 13 as an open/close member. The sliding door 13 is guided along a guide rail 14 fixed to the side part of the vehicle body 12 so as to be freely opened and closed between a full-close position represented by solid lines and a full-open position represented by two-dot chains in FIG. 1. When passengers and merchandise are loaded or unloaded, the sliding door 13 is opened up to a predetermined ratio of opening and then is used.

As depicted in FIG. 2, the sliding door 13 is provided with a roller assembly 15. When this roller assembly 15 is guided along the guide rail 14, the sliding door 13 becomes movable in front and back directions of the vehicle 11. Also, a vehicle-front side of the guide rail 14 is provided with a curve portion 14a curved toward a vehicle compartment. When the roller assembly 15 is guided along the curve portion 14a, the sliding door 13 is closed in a state of being drawn inside the vehicle body 12 so as to be accommodated in the same plane as a side surface of the vehicle body 12. Although not shown, the roller assembly 15 is also provided to a portion (center portion) shown in the drawings as well as vertical portions (upper and lower portions) of a front end of the sliding door 13, and, correspondingly to these, the vertical portions of an opening of the vehicle body 12 are also provided with guide rails (not shown) so as to correspond to the upper and lower positions. Thus, the sliding door 13 is supported at three positions in total in the vehicle body 12.

This vehicle 11 is provided with an automatic opening/closing apparatus for vehicle 21 (hereinafter "opening/closing apparatus 21") for automatically opening and closing the sliding door 13. This opening/closing apparatus 21 includes: a driving unit 22 disposed inside the vehicle body 12 so as to be adjacent to an approximately center portion of the guide rail 14 in vehicle-front and vehicle-back directions; an open-side cable 24a as a cable member connected from an open side (vehicle-back side) to the roller assembly 15 (sliding door 13) via a reverse pulley 23a provided at an end of the guide rail 14 on the vehicle-back side; and a close-side cable 24b as a cable member connected from a close side (vehicle-front side) to the roller assembly 15 (sliding door 13) via a reverse pulley 23b provided at an end of the guide rail 14 on the vehicle-front side. When the open-side cable 24a is drawn by the driving unit 22, the sliding door 13 is caused to perform automatically an open operation. When the close-side cable 24b is drawn by the driving unit 22, the sliding door 13 is caused to perform automatically a close operation.

Figure 3:
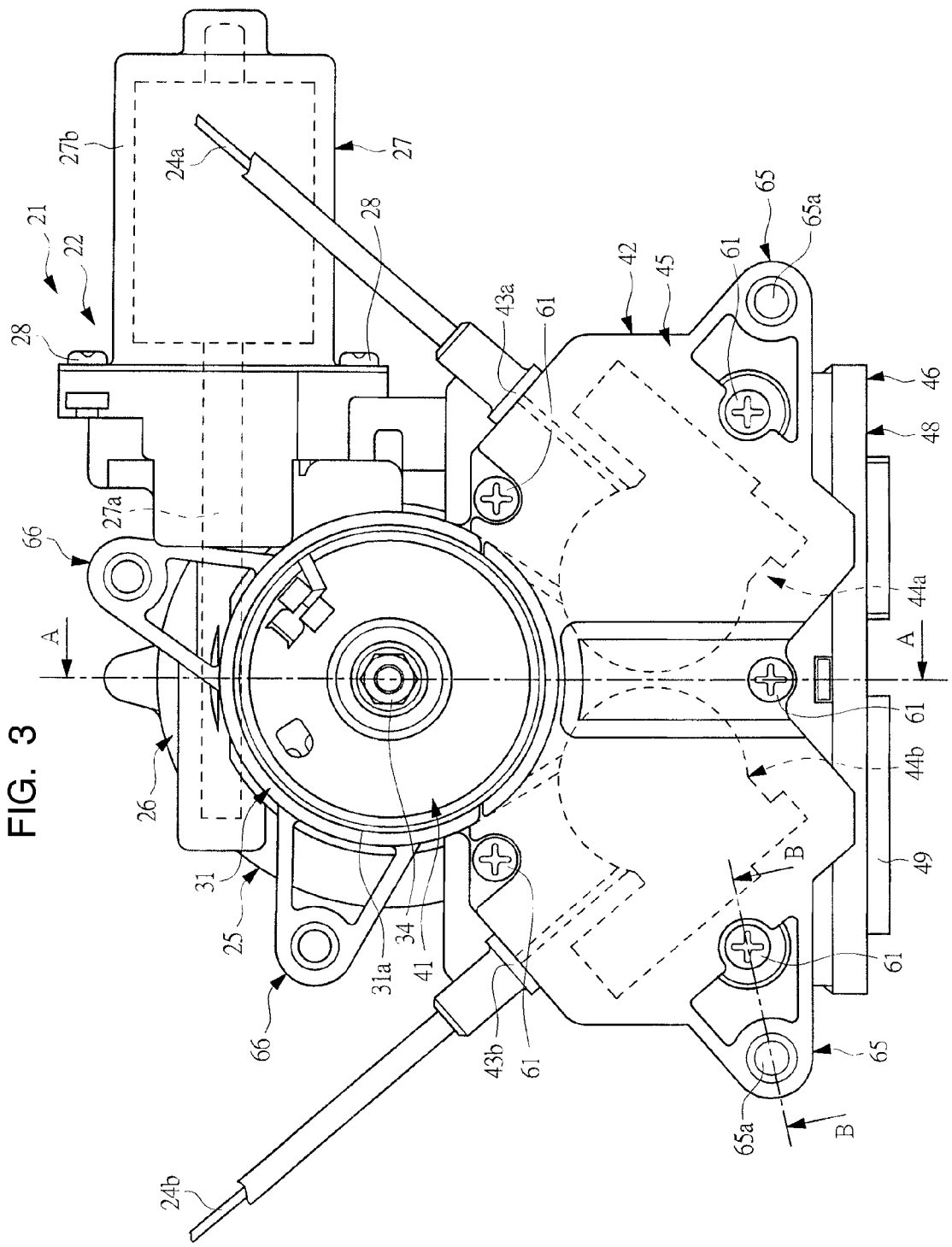
FIG. 3 is a front view showing a detail of a driving unit depicted in FIG. 2.
Figure 4:
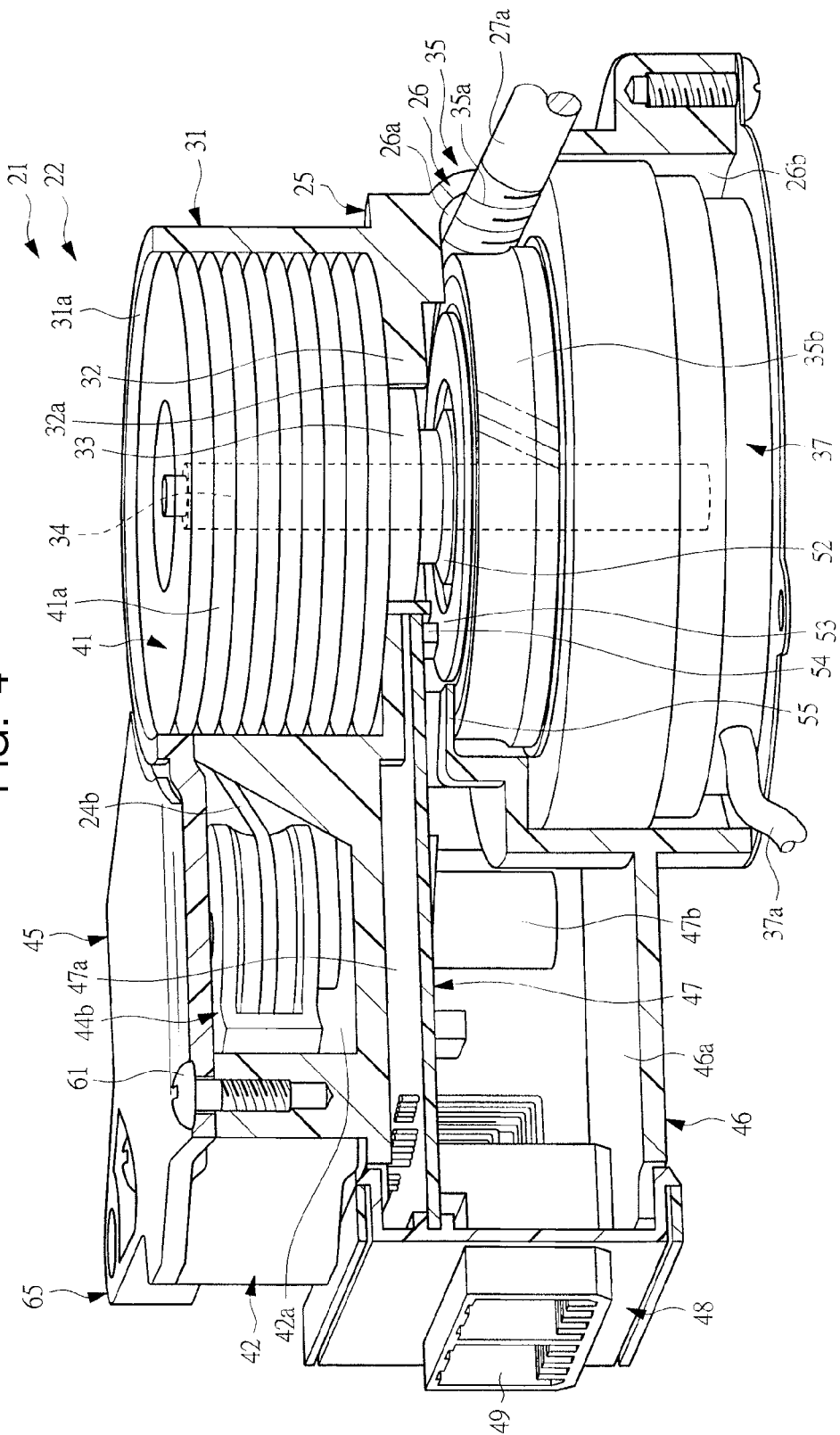
FIG. 4 is a sectional view taken along line A-A in FIG. 3.

FIG. 3 is a front view showing a detail of the driving unit depicted in FIG. 2, and FIG. 4 is a sectional view taken along line A-A in FIG. 3.

As depicted in FIGS. 3 and 4, the driving unit 22 is provided with a resin-made case 25 disposed in the vehicle body 12. This case 25 includes a deceleration-mechanism housing portion 26 formed into an approximately cylindrical shape. Outside this deceleration-mechanism housing portion 26, an electric motor 27 is attached as a driving source. The electric motor 27 is, for example, a brush-equipped direct-current motor, and its rotational shaft 27a is rotatable in both forward and backward directions, and a portion of its motor yoke 27b is fixed to the case 25 by bolts (fastening members) 28. As depicted in FIG. 4, a deceleration-mechanism accommodation room 26a is provided inside the deceleration-mechanism housing portion 26, and the rotational shaft 27a of the electric motor 27 protrudes into this deceleration-mechanism accommodation room 26a.

The case 25 is provided with a drum housing portion 31 as a housing portion of a driving rotor, that is, a rotor housing portion integrally with the deceleration-mechanism housing portion 26. The drum housing portion 31 is formed in such an approximately cylindrical shape as to be open on an opposite side to the deceleration-mechanism housing portion 26, and its interior serves as a drum accommodation room 31a. As depicted in FIG. 4, the drum accommodation room 31a and the deceleration-mechanism accommodation room 26a are partitioned by a partition wall 32. A supporting hole 32a is formed in the partition wall 32, wherein a bearing 33 is mounted in the supporting hole 32a and a driving shaft 34 is rotatably supported in the case 25 by the bearing 33. One end of the driving shaft 34 protrudes into the deceleration-mechanism accommodation room 26a while the other end thereof protrudes into the drum accommodation room 31a.

In order to decelerate rotation of the rotational shaft 27a up to the predetermined number of rotations and transmit it to the driving shaft 34, a deceleration mechanism 35 is accommodated in the deceleration-mechanism accommodation room 26a. The deceleration mechanism 35 serves as a worm-gear mechanism including a worm 35a and a worm wheel 35b as a rotor member. The worm 35a is formed integrally with the rotational shaft 27a on an outer circumferential surface of the rotational shaft 27a, and the worm wheel 35b is relatively rotatably supported by the driving shaft 34, thereby being rotatable inside the case 25.

Also, as depicted in FIG. 4, the deceleration-mechanism housing portion 26 of the case 25 is provided with a clutch accommodation room 26b integrally with the deceleration-mechanism accommodation room 26a. An electromagnetic clutch 37 as a motive-power intermissive mechanism is accommodated in this clutch accommodation room 26b in order to interrupt motive-power transmission between the worm wheel 35b and the driving shaft 34, that is, between the electric motor 27 and the driving shaft 34. This electromagnetic clutch 37 is a so-called friction type, and becomes in a connection state when a current is carried via a connection wiring 37a, thereby allowing the motive-power transmission between the worm wheel 35b and the driving shaft 34. Therefore, when the electric motor 27 is operated after the electromagnetic clutch 37 has been in a current-carried state, the rotation of the rotational shaft 27a is transmitted to the driving shaft 34 via the deceleration mechanism 35 and the electromagnetic clutch 37, thereby causing the driving shaft 34 to rotate along with the worm wheel 35b. Meanwhile, when the current stops, the electromagnetic clutch 37 becomes in an intermissive state, thereby intermitting a motive-power transmission path between the worm wheel 35b and the driving shaft 34.

As depicted in FIGS. 3 and 4, a driving drum 41 as a driving rotor is accommodated in the drum accommodation room 31a. The driving drum 41 is made of a resin, wherein its axial center is fixed to a tip of the driving shaft 34 so that the driving drum 41 can be rotated inside the case 25. A spiral guide groove 41a is formed in an outer circumferential surface of the driving drum 41. The open-side cable 24a guided by the driving unit 22 is wound around the driving drum 41 along the guide groove 41a, and simultaneously its end is fixed to the driving drum 41. Similarly, the close-side cable 24b guided by the driving unit 22 is wound around the driving drum 41 along the guide groove 41a in the same direction as that of the open-side cable 24a, and its end is fixed to the driving drum 41. That is, one end side of each of the cables 24a and 24b is wound around the driving drum 41 and the other end side thereof is connected to the sliding door 13. When the electric motor 27 is activated, its rotation is transmitted via the deceleration mechanism 35 and the electromagnetic clutch 37 to the driving shaft 34 and the driving drum 41 is driven and rotated by the electric motor 27 for rotation along with the driving shaft 34. When the driving drum 41 is rotated, either one of the cables 24a and 24b is reeled by the driving drum 41 according to a rotating direction of the driving drum 41, thereby causing the sliding door 13 to be drawn by the relevant one of the cables 24a and 24b and to carry out open or close movement.

The case 25 is provided with a tensioner housing portion 42 integrally with the drum housing portion 31 and the deceleration-mechanism housing portion 26 and adjacently to the drum housing portion 31. The tensioner housing portion 42 is formed into such a bathtub shape as to be open in the same direction as that of the drum housing portion 31 and, as depicted in FIG. 4, its interior serves as a tensioner accommodation room 42a. The tensioner housing portion 42 is provided with a pair of cable incoming/outgoing portions 43a and 43b for drawing the cables 24a and 24b into the tensioner accommodation room 42a, respectively. The open-side cable 24a and the close-side cable 24b are drawn respectively from the corresponding cable incoming/outgoing portions 43a and 43b into the tensioner accommodation room 42a, thereby being guided via the tensioner accommodation room 42a into the drum accommodation room 31a. As depicted by broken lines in FIG. 3, a pair of tensioner mechanisms 44a and 44b as necessary appliances is accommodated in the tensioner accommodation room 42a, and a predetermined tension is applied to each of the cables 24a and 24b by these tensioner mechanisms 44a and 44b. For this reason, even when the roller assembly 15 is guided to the curve portion 14a of the guide rail 14 and length of movement paths of the cables 24a and 24b is changed between the sliding door 13 and the driving drum 41, the tension of each of the cables 24a and 24b can be kept constant. Also, a cover 45 is attached to the tensioner housing portion 42, whereby this cover 45 causes the tensioner accommodation room 42a to be blocked so that the tensioner mechanisms 44a and 44b is covered with the cover 45.

In the case 25, a substrate housing portion 46 is provided integrally with the deceleration-mechanism housing portion 26, the drum housing portion 31, and the tensioner housing portion 42. This substrate housing portion 46 is located on a back side of the tensioner housing portion 42, and is formed into such a box shape as to have an opening in a direction shifted by 90 degrees with respect to the openings of the deceleration-mechanism accommodation room 26a and the clutch accommodation room 26b, and its interior serves as a substrate accommodation room 46a. In the substrate accommodation room 46a, a control substrate 47 as a necessary appliance is accommodated for controlling operations of the electric motor 27 and the electromagnetic clutch 37. The control substrate 47 has a structure in which a control circuit equipped with an electronic component 47b such as a CPU or memory is mounted on a substrate main body 47a made of a resin, thereby being connected to the electric motor 27 by a connection terminal etc. (not shown) wired inside the case 25. Also, the substrate accommodation room 46a is enclosed by a substrate cover 48. This substrate cover 48 is provided with a connector 49 connected to the control substrate 47. The control substrate 47 is connected via this connector 49 to a power supply (not shown) such as a battery mounted on the vehicle 11 and to an open/close switch etc. disposed inside the vehicle compartment.

Here, in this opening/closing apparatus 21, the drum housing portion 31 that accommodates the driving drum 41 and the substrate housing portion 46 that accommodates the control substrate 47 are formed integrally with the same case 25, and it is not required to provide a case that accommodates the control substrate 47 separately from the case 25 that accommodates the driving drum 41. Therefore, the number of components of the opening/closing apparatus 21 is reduced and accordingly its cost can be reduced.

In this manner, in the opening/closing apparatus 21, since the driving drum 41 and the control substrate 47 are accommodated in the same case 25, it is unnecessary to provide a case for accommodating the control substrate 47 separately from the case 25 that accommodates the driving drum 41, whereby the cost of the opening/closing apparatus 21 can be reduced. Also, it is unnecessary to provide separately a case for accommodating the control substrate 47, so that the driving drum 41 and the control substrate 47 can be efficiently disposed in the same case 25, whereby the opening/closing apparatus 21 can be downsized. Furthermore, since the control substrate 47 and the electric motor 27 can be connected inside the case 25, an external harness etc. for connecting the electric motor 27 and the control substrate 47 is not required, whereby the cost of the opening/closing apparatus 21 can be reduced.

Also, in the opening/closing apparatus 21, the tensioner housing portion 42 that accommodates the tensioner mechanisms 44a and 44b is also provided integrally with the case 25. Therefore, even when the tensioner mechanisms 44a and 44b are intended to be provided, providing a new case for accommodating these mechanisms becomes unnecessary, the cost of the opening/closing apparatus 21 is reduced, and it can be downsized.

Furthermore, in the opening/closing apparatus 21, the deceleration-mechanism housing portion 26 that accommodates the deceleration mechanism 35 for decelerating the rotation of the electric motor 27 to transmit it to the driving drum 41 is also provided integrally with the case 25. Therefore, providing separately another case for accommodating the deceleration mechanism 35 becomes unnecessary, the cost of the opening/closing apparatus 21 is further reduced, and it can be also downsized.

Still further, in the opening/closing apparatus 21, the clutch accommodation room 26b for accommodating the electromagnetic clutch 37 that interrupts motive-power transmission between the worm wheel 35b and the driving shaft 34 is provided in the case 25. Therefore, providing separately a case that accommodates the electromagnetic clutch 37 becomes unnecessary, the cost of the opening/closing apparatus 21 is further reduced, and it can be also downsized.

Figure 5:
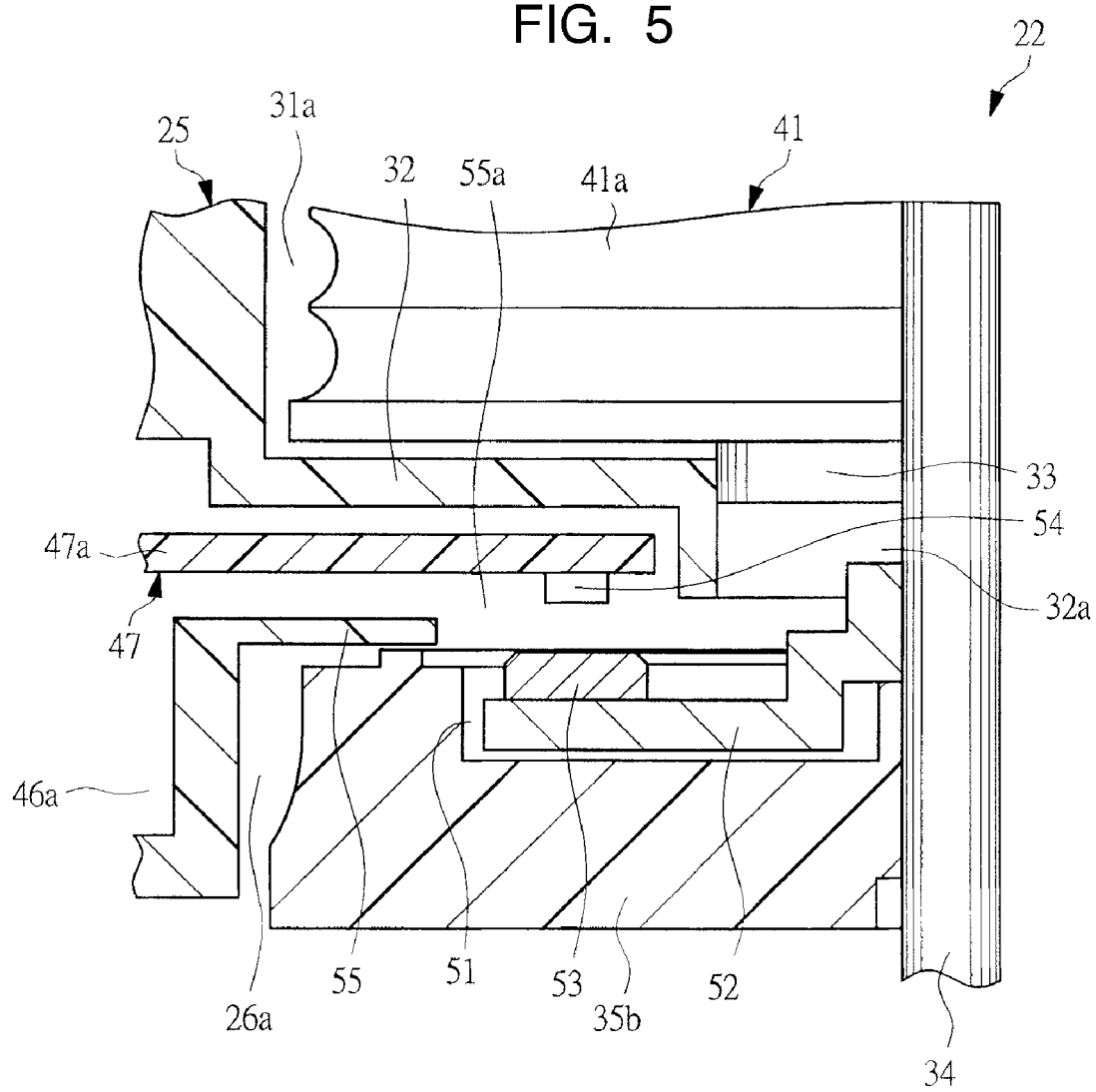
FIG. 5 is a sectional view showing a detail of a rotation sensor and a multi-polar magnetized magnet.

FIG. 5 is a sectional view showing a detail of a rotation sensor and a multi-polar magnetized magnet.

As depicted in FIG. 5, a circular concave portion 51 is formed at an axial-directional end portion of the worm wheel 35b located on an opposite side to the driving drum 41. A rotating plate 52 formed into a disk shape is fixed to the driving shaft 34 so as to be positioned inside the concave portion 51. A multi-polar magnetized magnet 53 as a detected subject is fixed to the rotating plate 52, and the multi-polar magnetized magnet 53 is provided with many magnetic poles aligned in a circumferential direction. In this manner, the multi-polar magnetized magnet 53 is fixed to the driving shaft 34 via the rotating plate 52, and the multi-polar magnetized magnet 53 is rotated between the driving drum 41 and the worm wheel 35b together with the driving shaft 34 concentrically with the driving shaft 34.

On the other hand, a part of the substrate accommodation room 46a protrudes into a gap between the driving drum 41 and the worm wheel 35b, and a part of the substrate main body 47a of the control substrate 47 is disposed between the driving drum 41 and the worm wheel 35b. In a part of the substrate main body 47a disposed between the driving drum 41 and the worm wheel 35b, a rotation sensor 54 for detecting the rotation of the driving shaft 34 is mounted. The rotation sensor 54 is a Hall IC, which opposes to the multi-polar magnetized magnet 53 via a window 55a provided to a partition wall 55 partitioning the substrate accommodation room 46a and the deceleration-mechanism accommodation room 26a. For this reason, when the electric motor 27 is activated to rotate the driving shaft 34, a pulse signal with a cycle depending on the rotation of the driving shaft 34, that is, the multi-polar magnetized magnet 53 is outputted from the rotation sensor 54. The rotation sensor 54 is connected to a control circuit implemented on the substrate main body 47a, and the pulse signal outputted from the rotation sensor 54 is inputted to the control circuit. The control substrate 47 recognizes rotation speed of the driving shaft 34 based on the cycle of the pulse signal, and counts the pulse signal, thereby recognizing an amount of rotation of the driving shaft 34, that is, the door position of the sliding door 13. Based on such recognition information, the control substrate 47 then controls the operation of the electric motor 27.

In this manner, in the opening/closing apparatus 21, the part of the control substrate 47 is disposed between the driving drum 41 and the worm wheel 35b, and the rotation sensor 54 is mounted on the part, so that the substrate for the rotation sensor 54 is not required to be provided separately from the control substrate 47. Therefore, the number of components forming the substrate for providing the rotation sensor 54 is reduced, whereby the cost of the opening/closing apparatus 21 can be reduced.

Incidentally, in the present embodiment, the rotation sensor 54 is intended to oppose to the multi-polar magnetized magnet 53 via the window 55a provided on the partition wall 55. However, the present invention is not limited to this embodiment, and may have a structure of opposing the rotation sensor 54 to the multi-polar magnetized magnet 53 via the partition wall 55 without providing the window 55a to the partition wall 55.

Figure 6:
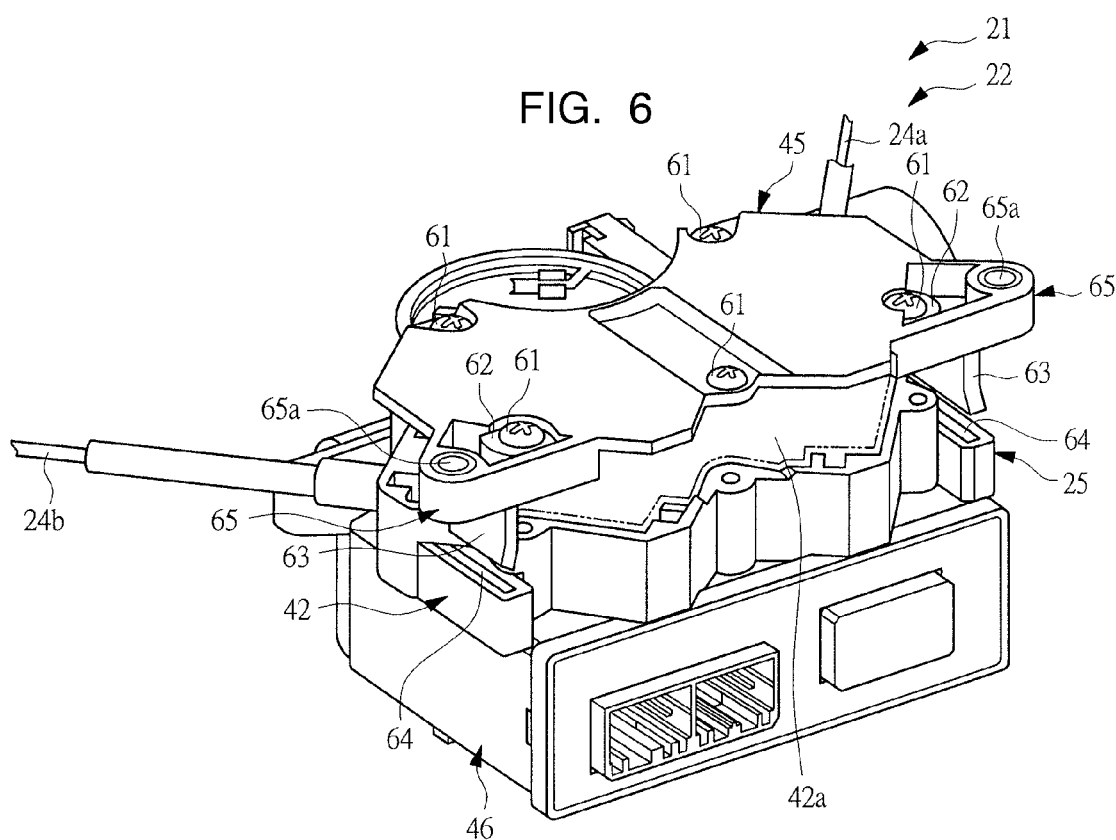
FIG. 6 is an exploded perspective view showing a case and a cover depicted in FIG. 3.
Figure 7:
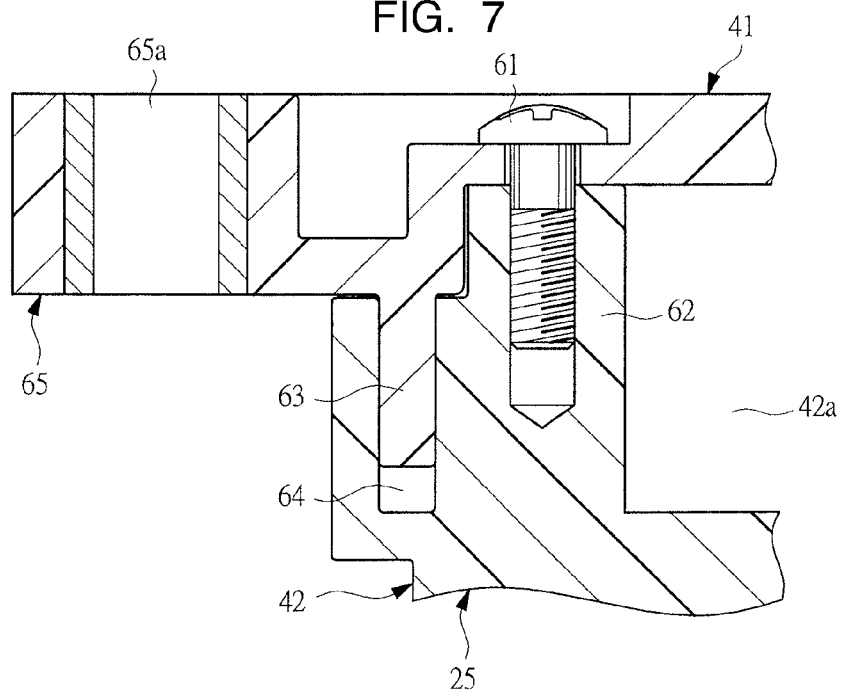
FIG. 7 is a sectional view taken along line B-B depicted in FIG. 3.

FIG. 6 is an exploded perspective view of the case and the cover depicted in FIG. 3, and FIG. 7 is a sectional view taken along line B-B depicted in FIG. 3.

To the tensioner housing portion 42 of the case 25, the cover 45 for enclosing the tensioner accommodation room 42a is attached. This cover 45 is formed into a plate shape and made of a resin, and is fixed to the tensioner housing portion 42 by five screw members 61. With this cover 45, the tensioner mechanisms 44a and 44b are covered.

A pair of engaging legs 63 as engaging portions is provided integrally with the cover 45 so as to be adjacent to respective screw insertion portions 62 into which the screw members 61 are inserted. On the other hand, a pair of engaging grooves 64 corresponding to the respective engaging legs 63 is formed in the case 25. The engaging legs 63 are each formed into a plate-piece shape and protrude toward the case 25. The engaging grooves 64 are each formed into a groove shape slightly larger in width than the engaging leg 63. When the cover 45 is attached to the case 25, as depicted in FIG. 7, each of the engaging legs 63 is inserted into the relevant engaging groove 64, thereby being engaged with the engaging groove 64 in a manner of concave-convex engagement. For this reason, when the cover 45 is fixed to the case 25 by the screw members 61 screwed into the screw insertion portion, the cover 45 is reliably engaged with the case 25 by the engaging legs 63, whereby a fixing strength of the cover 45 to the case 25 is increased.

The cover 45 is provided with a pair of attaching legs 65 as fixing portions for fixing the driving unit 22 to the vehicle body 12. Each of these attaching legs 65 is adjacent to the relevant engaging leg 63, is disposed so as to be aligned with the screw insertion portion 62 across the engaging leg 63, and is formed so as to have high stiffness with respect to the cover 45 and the case 25 to which the cover 45 is fixed. Also, each attaching leg 65 is provided with a bolt insertion hole 65a into which a bolt for fixing (not shown) is inserted. To prevent an axial direction of each of these bolt insertion holes 65a from overlapping the case 25, the attaching leg 65 is formed so as to protrude in a width direction with respect to the case 25. These attaching legs 65 are directly fixed to a panel of the vehicle body 12 by bolts (not shown) that are inserted into the bolt insertion holes 65a without interposing brackets etc. For this reason, the driving unit 22 is fixed to the vehicle body 12 by the attaching legs 65. Incidentally, in the present embodiment, the deceleration-mechanism housing portion 26 is also provided with a pair of attaching legs 66, and the driving unit 22 is fixed to the panel of the vehicle body 12 by the four attaching legs 65 and 66 in total.

In this manner, in the opening/closing apparatus 21, the attaching legs 65 fixed to the vehicle body 12 are provided to the cover 45 that encloses the tensioner housing portion 42 provided to the case 25, so that the case 25, that is, the driving unit 22 can be fixed to the vehicle body 12 without using other members such as brackets. Therefore, the number of components of the opening/closing apparatus 21 is reduced, and its cost can be reduced. Also, when the driving unit 22 is shared with a plurality of vehicle types, such shared use can be achieved by replacing only the cover 45 depending on the vehicle type without preparing a bracket etc. depending on the vehicle type. Therefore, even when the driving unit 22 is shared with other vehicle types, its cost can be reduced.

Furthermore, in the opening/closing apparatus 21, since the engaging legs 63 that are engaged with the case 25 in a manner of the convex-concave engagement are provided to the cover 45 so as to be adjacent to the attaching legs 65, loads exerted on the attaching legs 65 can be reliably supported by the case 25 via the engaging legs 63. For this reason, the fixing strength of the driving unit 22 to the vehicle body 12 can be increased by the attaching legs 65.

Incidentally, in the present embodiment, the cover 45 that encloses the tensioner accommodation room 42a is intended to be provided with the attaching legs 65 as the fixing portions. However, the present invention is not limited to the embodiment and, for example, so long as there is a cover, which encloses the case 25 and with which a necessary appliance is covered, such as the substrate cover 48 that is attached to the substrate housing portion 46 accommodating the control substrate 47 and covers the control substrate 47 or a cover that is attached to the drum housing portion 31 accommodating the driving drum 41 and covers the driving drum 41, the attaching legs 65 as the fixing portions may be provided to the above cover.

Also, in the present embodiment, the cover 45 is provided with the engaging legs 63 each formed into a plate-piece shape, and the engaging grooves 64 are formed in the case 25. However, the present invention is not limited to the embodiment and, for example, so long as there is a structure, in which the cover 45 is engaged with the case 25 in a manner of the concave-concave engagement, such as a structure in which the case 25 is provided with the engaging legs 63 and the cover 45 is provided with the engaging grooves 64, the present invention may adopt the above structure.

Figure 8:
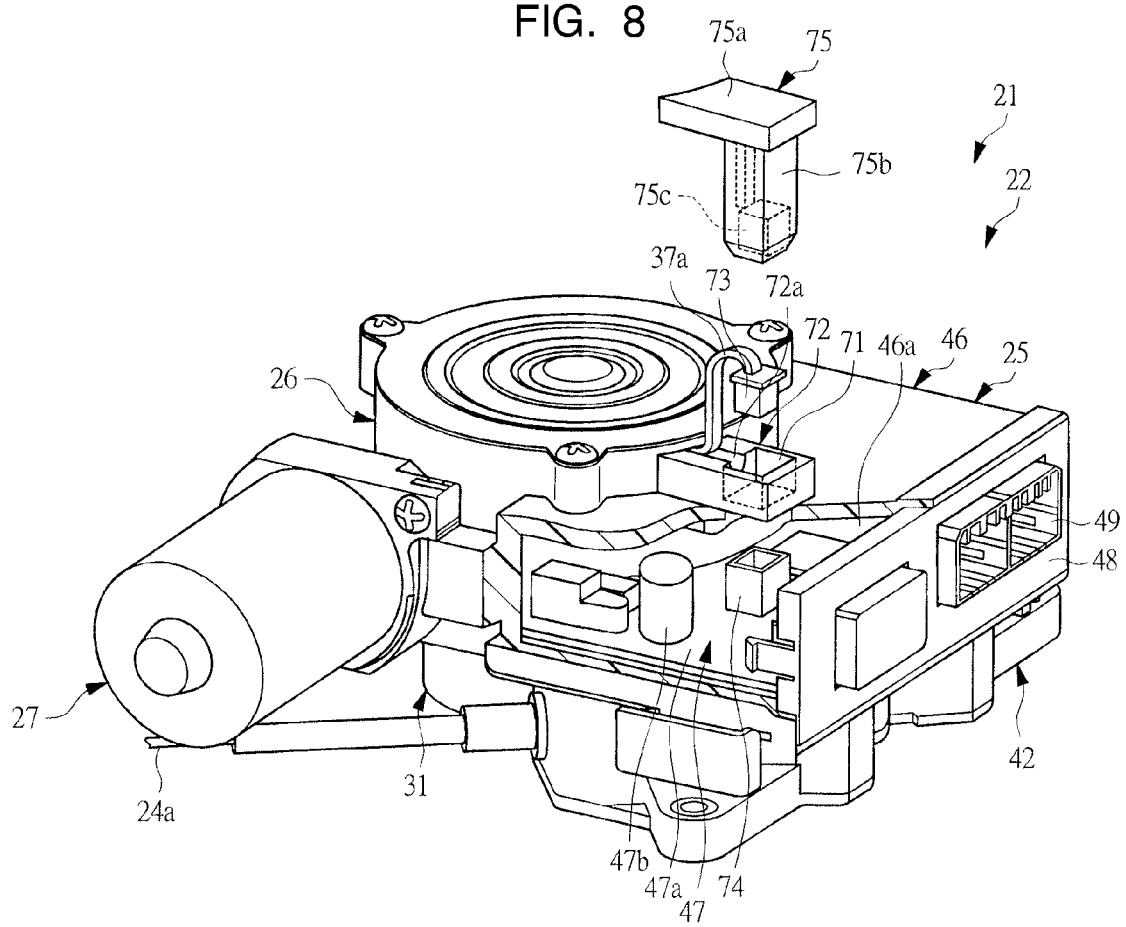
FIG. 8 is a partially-broken sectional view of the driving unit depicted in FIG. 3.
Figure 9:
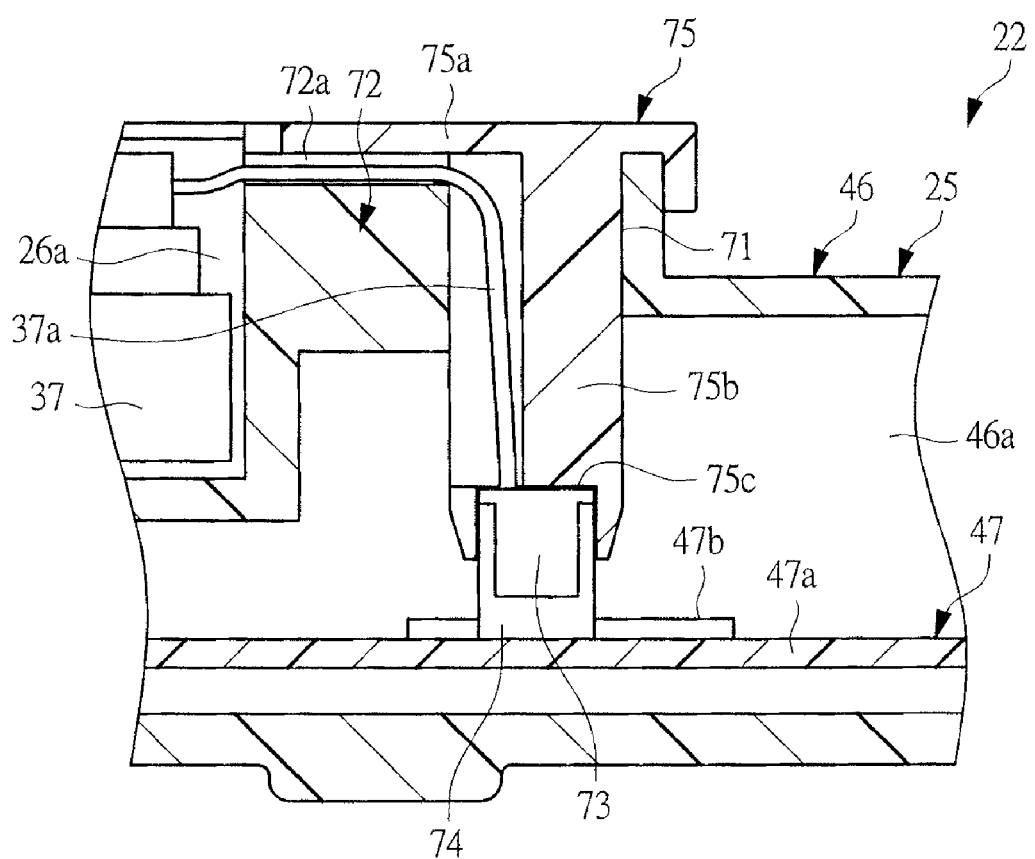
FIG. 9 is a sectional view showing a connection structure between a connector of an electromagnetic clutch and a control substrate.

FIG. 8 is a partially-broken sectional view of the driving unit depicted in FIG. 3, and FIG. 9 is a sectional view showing a connection structure between a connector of the electromagnetic clutch and the control substrate.

As depicted in FIGS. 8 and 9, in order that a connection wiring 37a provided to the electromagnetic clutch 37 is connected to the control substrate 47, a wiring lead hole 71 is formed in the case 25. An outer surface of the substrate housing portion 46 in the case 25 is provided with a guide block 72 adjacently to the clutch accommodation room 26b. The wiring lead hole 71 is formed in the guide block 72 so as to be adjacent to an opening of the clutch accommodation room 26b and to be open toward the same direction as that of the clutch accommodation room 26b. By this wiring lead hole 71, the substrate accommodation room 46a communicates with an interior and an exterior of the case 25.

The connection wiring 37a of the electromagnetic clutch 37 is drawn outside the case 25 from the opening of the clutch accommodation room 26b, and is laid down along a guide groove 72a formed in the guide block 72, thereby being drawn inside the substrate accommodation room 46a from the wiring lead hole 71. Also, a tip of the connection wiring 37a is provided with a convex type connector 73. By engaging this connector 73 with a concave type connector 74 provided to the control substrate 47, the connection wiring 37a, that is, the electromagnetic clutch 37 is intended to be connected to the control substrate 47.

A holder 75 for facilitating the connection between the connection wiring 37a and the control substrate 47 is removably mounted on the wiring lead hole 71. This holder 75 is made of a resin, and has a cover plate 75a disposed on the guide block 72 to cover the guide groove 72a and the wiring lead hole 71, and a holding portion 75b formed into a rectangular parallelepiped shape and protruding predetermined length from the cover plate 75a toward the interior of the substrate accommodation room 46a. A tip of the holding portion 75b is provided with a holding hole 75c. The connector 73 of the connection wiring 37a is held by the holder 75 as being inserted into the holding hole 75c. By mounting the holder 75 on the case 25 so that the holding portion 75b in a state of holding the connector 73 is inserted into the wiring lead hole 71, as depicted in FIG. 9, the connector 73 of the connection wiring 37a is intended to be connected to the connector 74 of the control substrate 47. At this time, the holder 75 is guided along the guide block 72 to move toward the connector 74 of the control substrate 47, so that even when each of the connectors 73 and 74 cannot be viewed, each of the connectors 73 and 74 can be reliably engaged by mounting the holder 75 on the case 25.

In this manner, in the opening/closing apparatus 21, the connection wiring 37a of the electromagnetic clutch 37 is drawn out from the clutch accommodation room 26b and is also drawn in the substrate accommodation room 46a via the wiring lead hole 71 provided to the case 25 so as to be connected to the control substrate 47. Therefore, even when the case 25 is such that the clutch accommodation room 26b and the substrate accommodation room 46a are disposed for their openings to be oriented in different directions, the connection wiring 37a of the electromagnetic clutch 37 can be easily connected to the control substrate 47.

Also, in the opening/closing apparatus 21, the connector 73 provided to the connection wiring 37a is held by the holder 75, and this holder 75 is mounted on the wiring lead hole 71 provided to the case 25, thereby engaging the connector 73 with the connector 74 of the control substrate 47. Therefore, a connecting operation of the connection wiring 37a to the control substrate 47 can be further facilitated.

Furthermore, in the opening/closing apparatus 21, the connection wiring 37a is drawn in the substrate accommodation room 46a from the wiring lead hole 71, and a space between the substrate accommodation room 46a and the clutch accommodation room 26b is covered with the cover plate 75a of the holder 75. Therefore, the connection wiring 37a is not exposed to the outside, thereby making it possible to prevent the connection wiring 37a from interfering with other components.

Incidentally, since the holder 75 is fixed to the case 25 by, for example, being pressed into the case 25 or engaging its claw with the case 25, the holder 75 is prevented from being released from the case 25.

Next, an operation of the above-structured opening/closing apparatus 21 will be described.

When an open/close switch (not shown) is operated to an open side and an instruction signal for causing the sliding door 13 to operate in an open direction is inputted into the control substrate 47, the electromagnetic clutch 37 is switched to a connection state. Next, the electric motor 27 is driven in a normal-rotation direction to cause the driving drum 41 to rotate in a counterclockwise direction in FIG. 3, and the open-side cable 24a is reeled by the driving drum 41 to cause the sliding door 13 to be drawn by the open-side cable 24a and move toward the full-open position. Conversely, when the open/close switch is operated to a close side and an instruction signal for causing the sliding door 13 to operate in a close direction is inputted into the control substrate 47, the electromagnetic clutch 37 is switched to a connection state. Next, the electric motor 27 is driven in a reverse-rotation direction to cause the driving drum 41 to rotate in a clockwise direction in FIG. 3. The close-side cable 24b is reeled by the driving drum 41 to cause the sliding door 13 to be drawn by the close-side cable 24b and move toward the full-close position. Also, when the sliding door 13 is manually operated for opening or closing, the electromagnetic clutch 37 is switched to an intermissive state while the electric motor 27 is stopped.

On the other hand, when the sliding door 13 is automatically or manually opened and closed and the length of the movement paths of the cables 24a and 24b is changed by, example, the roller assembly 15 passing through the curve portion 14a of the guide rail 14, the tensions of the cables 24a and 24b are adjusted by the tensioner mechanisms 44a and 44b so as to fall within a predetermined range.

The present invention is not limited to the above-described embodiments and, needless to say, can be variously modified within a scope of not departing from the gist thereof. For example, although the open/close member is used as the sliding door 13 that is opened and closed in a sliding manner in the present embodiment, the present invention is not limited to this and there may be used other open/close members such as a horizontal hinged door for loading/unloading and a back door provided to a rear end portion of the vehicle.

Also, although the brush-equipped electric motor 27 is used as a driving source in the present embodiment, the present invention is not limited to this and may use other driving sources so long as they can drive the driving drum 41 for rotation in addition to a brushless electric motor.

Furthermore, although two cables, that is, the open-side cable 24a and the close-side cable 24b are used in the present embodiment, the present invention is not limited to this and may adopt a structure in which an intermediate portion of one cable is wound around the driving drum 41 and its both end portions are connected to the sliding door 13.

What is claimed is:

1. An apparatus movably connecting an open/close member to a vehicle body, the apparatus comprising:
    a cable member connected to the open/close member;
    a driving rotor disposed in the vehicle body, the cable member being wound around the driving rotor;
    a driving source for driving the driving rotor for rotation;
    a control substrate for controlling an operation of the driving source;
    a case formed integrally with a rotor housing portion for accommodating the driving rotor and with a substrate housing portion for accommodating the control substrate, the case being attached to the driving source, and fixed to the vehicle body;
    a rotor member rotatably accommodated in the case and driven for rotation by the driving source;
    a driving shaft rotatably supported by the case, rotating along with the rotor member, the driving rotor being fixed to the driving shaft; and
    a detected subject disposed between the rotor member and the driving rotor and rotating along with the driving shaft,
    wherein the control substrate comprises a substrate main body with a portion disposed between the rotor member and the driving rotor, a control circuit implemented on the substrate main body, and a rotation sensor for detecting rotation of the driving shaft is mounted on the portion of the substrate main body disposed between the rotor member and the driving rotor so as to oppose to the detected subject.

2. The apparatus according to claim 1,
    wherein an opening is formed in the substrate housing portion suitable for insertion of the control substrate into the case along the direction of the diameter of the driving rotor.

3. The apparatus according to claim 2, further comprising a motive-power intermissive mechanism for intermitting motive-power transmission between the rotor member and the driving shaft, the motive-power intermissive mechanism being provided in the case.

4. The apparatus according to claim 2, further comprising a tensioner mechanism for applying a predetermined tension to the cable member,
    wherein a tensioner housing portion for accommodating the tensioner mechanism is provided to the case integrally with the rotor housing portion and the substrate housing portion.

5. The apparatus according to claim 2, further comprising a reduction mechanism for reduction at rotation of the driving source to transmit it to the driving rotor,
    wherein a reduction-mechanism housing portion for accommodating the reduction mechanism is provided to the case integrally with the rotor housing portion and the substrate housing portion.

6. The apparatus according to claim 1, further comprising a tensioner mechanism for applying a predetermined tension to the cable member,
    wherein a tensioner housing portion for accommodating the tensioner mechanism is provided to the case integrally with the rotor housing portion and the substrate housing portion.

7. The apparatus according to claim 1, further comprising a reduction mechanism for reduction at rotation of the driving source to transmit it to the driving rotor,
    wherein a reduction-mechanism housing portion for accommodating the reduction mechanism is provided to the case integrally with the rotor housing portion and the substrate housing portion.

* * * * *

UNITED STATES PATENT AND TRADEMARK OFFICE
CERTIFICATE OF CORRECTION

PATENT NO. : 7,930,855 B2
APPLICATION NO. : 12/022321
DATED : April 26, 2011
INVENTOR(S) : Yasushi Yoshida et al.

It is certified that error appears in the above-identified patent and that said Letters Patent is hereby corrected as shown below:

Title Page item 30

Foreign Application Priority Data

Please add:

January 31, 2007 (JP) ..................2007-021934

Signed and Sealed this
Third Day of January, 2012

David J. Kappos
*Director of the United States Patent and Trademark Office*